(12) United States Patent
Tsutsui et al.

(10) Patent No.: US 12,408,676 B2
(45) Date of Patent: Sep. 9, 2025

(54) PIPING STRUCTURE, MANUFACTURING SYSTEM FOR PROCESSED FOOD, METHOD FOR CONVEYING FOOD, AND METHOD FOR MANUFACTURING PROCESSED FOOD

(71) Applicant: NICHIREI FOODS INC., Tokyo-to (JP)

(72) Inventors: Yasuyuki Tsutsui, Chiba (JP); Teppei Nishihara, Tokyo-to (JP); Masahiko Honda, Tokyo-to (JP); Shinya Tsukamoto, Chiba (JP)

(73) Assignee: NICHIREI FOODS INC., Tokyo (JP)

( * ) Notice: Subject to any disclaimer, the term of this patent is extended or adjusted under 35 U.S.C. 154(b) by 646 days.

(21) Appl. No.: 17/625,374

(22) PCT Filed: Jul. 6, 2020

(86) PCT No.: PCT/JP2020/026323
§ 371 (c)(1),
(2) Date: Jan. 7, 2022

(87) PCT Pub. No.: WO2021/006231
PCT Pub. Date: Jan. 14, 2021

(65) Prior Publication Data
US 2022/0264900 A1 Aug. 25, 2022

(30) Foreign Application Priority Data
Jul. 8, 2019 (JP) .................................. 2019-126891

(51) Int. Cl.
*A22C 17/00* (2006.01)
*A23L 5/10* (2016.01)
(Continued)

(52) U.S. Cl.
CPC ............ *A22C 17/0093* (2013.01); *A23L 5/11* (2016.08); *A23P 20/12* (2016.08); *A23P 20/15* (2016.08);
(Continued)

(58) Field of Classification Search
CPC ...... A22C 17/0093; A23P 20/12; A23P 30/10; A23P 20/15; A23L 5/11; F16L 41/03; A23V 2002/00
(Continued)

(56) References Cited

U.S. PATENT DOCUMENTS 6,291,001 B1   9/2001   Fink et al.
2017/0268711 A1* 9/2017   Tanaka .................. F16L 55/027

FOREIGN PATENT DOCUMENTS

JP   2008-245560 A   10/2008
JP   2009-7069 A     1/2009
JP   2017-166012 A   9/2017

OTHER PUBLICATIONS

English translation of International Preliminary Report on Patentability and Written Opinion of the International Searching Authority for International Application No. PCT/JP2020/026323, dated Jan. 20, 2022.
(Continued)

*Primary Examiner* — Brent T O'Hern
(74) *Attorney, Agent, or Firm* — Birch, Stewart, Kolasch & Birch, LLP

(57) ABSTRACT

A piping structure comprises a first pipe to which food (H) is supplied, a plurality of second pipes provided downstream of the first pipe and connected to the first pipe, and a plurality of third pipes provided downstream of the second pipes, a number of the plurality of third pipes being connected to each of the second pipes.

4 Claims, 7 Drawing Sheets

(51) Int. Cl.
  *A23P 20/12*   (2016.01)
  *A23P 20/15*   (2016.01)
  *A23P 30/10*   (2016.01)
  *F16L 41/03*   (2006.01)

(52) U.S. Cl.
  CPC .............. *A23P 30/10* (2016.08); *F16L 41/03* (2013.01); *A23V 2002/00* (2013.01)

(58) Field of Classification Search
  USPC ........................................................ 426/416
  See application file for complete search history.

(56) References Cited

OTHER PUBLICATIONS

International Search Report, issued in PCT/JP2020/026323, dated Sep. 15, 2020.
Written Opinion of the International Searching Authority, issued in PCT/JP2020/026323, dated Sep. 15, 2020.

\* cited by examiner

PIPING STRUCTURE, MANUFACTURING SYSTEM FOR PROCESSED FOOD, METHOD FOR CONVEYING FOOD, AND METHOD FOR MANUFACTURING PROCESSED FOOD

TECHNICAL FIELD

The present invention relates to a piping structure for conveying food, a manufacturing system for a processed food, a method for conveying food, and a method for manufacturing a processed food.

BACKGROUND ART

Various processed foods are widely provided not only to general consumers but also to stores. The processed foods can be provided in various forms such as a normal temperature food, a refrigerated food, a chilled food, and a frozen food due to development of food processing technologies (especially, development of refrigerating and freezing technologies). Demand for such processed foods is expected to increase more and more in the future along with diversification of consumers' preferences, an increase in convenience needs, and improvement in awareness of food safety. In particular, it is desired to provide not only processed foods that are easy to be processed but also processed foods that are complicated and difficult to be processed.

Examples of such processed foods include a meat product produced from meat (livestock meat, poultry meat, etc.) cut into a lump, and a hamburger steak and a meat ball produced as follows: kneading a mixture acquired by mixing minced meat, chopped meat, etc., which is a main raw material, with an auxiliary raw material such as vegetables, breadcrumbs, and seasoning; molding kneaded dough; and heating the kneaded dough with an iron plate, an oven, a fryer, a steamer, etc.

For example, Patent Literature 1 discloses a molding method used for producing a livestock meat processed food having a homemade-looking shape and a soft texture that is easily loosened, and a discharge nozzle for a molding machine used in the molding method. In the discharge nozzle for a molding machine of Patent Literature 1, a kneaded dough as food is charged from a kneaded dough charging port. When the kneaded dough charged from the kneaded dough charging port passes through piping, the kneaded dough flows through a flow path, which branches to the right and left of a partial shielding member and then merges, to be discharged from a kneaded dough discharging port.

CITATION LIST

Patent Literature

Patent Literature 1: JP 2008-245560 A

Although a device for conveying food, such as the nozzle of Patent Literature 1 described above, is already known, such a device and method are desired to be further improved. That is, a device and a method capable of reducing damage to food when the food is conveyed are desired. For example, when food such as livestock meat cut into a lump is conveyed and the food is damaged during the conveyance, not only an aesthetic appearance of the food is impaired, but also taste such as texture is adversely affected, whereby a value as a product may be impaired without satisfying a predetermined standard.

To reduce damage to food, an operator may manually align the food and then convey the aligned food with a conveyor. In this case, although a predetermined standard is satisfied for an aesthetic appearance, texture, or the like of the food, there are problems in that the food varies in weight and the aligning work increases in time. This causes a problem in that production efficiency deteriorates.

The present invention is made in consideration of such a point, and an object of the present invention is to provide a piping structure, a manufacturing system for a processed food, a method for conveying food, and a method for manufacturing a processed food, which are capable of reducing damage to the food during conveyance of the food and improving production efficiency.

DISCLOSURE OF THE INVENTION

An aspect of the present invention is a piping structure for conveying food, the piping structure including: a first pipe to which the food is supplied; a plurality of second pipes provided downstream of the first pipe and connected to the first pipe; and a plurality of third pipes provided downstream of the second pipes, a number of the plurality of third pipes being connected to each of the second pipes.

The piping structure according to an aspect of the present invention may be configured such that the second pipes connected to the first pipe are larger in number than the third pipes connected to one of the second pipes.

The piping structure according to an aspect of the present invention may be configured as follows: each of the second pipes is connected to the first pipe with a first connecting pipe; the first connecting pipe includes a first connecting portion connected to the first pipe and a plurality of first curved portions that are provided downstream of the first connecting portion and that branch off from the first connecting portion; each of the third pipes is connected to the second pipe with a second connecting pipe; the second connecting pipe includes a second connecting portion connected to the second pipe and a plurality of second curved portions that are provided downstream of the second connecting portion and that branch off from the second connecting portion; the plurality of first curved portions merges in a first merging portion that has a curved shape in a section taken along a conveyance direction of the food; and the plurality of second curved portions merges in a second merging portion that has a curved shape in a section taken along the conveyance direction of the food.

The piping structure according to an aspect of the present invention may be configured such that the three second pipes are connected to the first pipe, and the two third pipes are connected to each of the three second pipes.

Another aspect of the present invention is a manufacturing system for a processed food, including: a conveyance mechanism having a piping structure according to the present invention; and a processing unit that processes the food conveyed by the conveyance mechanism.

Another aspect of the present invention is a method for conveying food, the method including: a first distributing step of distributing and conveying the food supplied to a first pipe, to a plurality of second pipes connected to the first pipe; and a second distributing step of distributing and conveying the food supplied to each of the second pipes, to a plurality of third pipes, a number of the plurality of third pipes being connected to each of the second pipes.

The method for conveying food according to an aspect of the present invention may be configured such that the second pipes connected to the first pipe are larger in number than the third pipes connected to one of the second pipes.

The method for conveying food according to an aspect of the present invention may be configured such that the three second pipes are connected to the first pipe, and the two third pipes are connected to each of the second pipes.

Another aspect of the present invention is a method for manufacturing a processed food, the method including the steps of: conveying the food by the method for conveying food according to the present invention; and processing the food conveyed in the step of conveying the food.

The present invention enables reducing damage to food during conveyance of the food and improving production efficiency.

DESCRIPTION OF EMBODIMENTS

Hereinafter, exemplary embodiments of the present invention will be illustrated with reference to the drawings. Each drawing illustrates elements in size and at a scale that are not necessarily identical to actual ones for convenience of illustration and understanding, and that are not identical among the drawings. However, a person skilled in the art can clearly grasp the configuration and operation and effect of the elements illustrated in each drawing in consideration of the description of the present specification and the scope of claims.

A specific type of food in the following embodiment is not particularly limited. Thus, the food may be meat (livestock meat (beef, pork, etc.) cut into a lump, poultry meat (chicken, etc.), or the like, meat molded into a lump, or minced meat obtained by mincing meat with a chopper or the like. The piping structure according to the present invention used in a conveyance mechanism can reduce damage to food during conveyance of the food, so that particularly meat cut into a lump can be suitably conveyed without destroying muscle fibers. The food may have a size of about 20 mm square or more and 100 mm square or less, and may have a size of about 35 mm square, for example.

Manufacturing System of Processed Food

Figure 1:
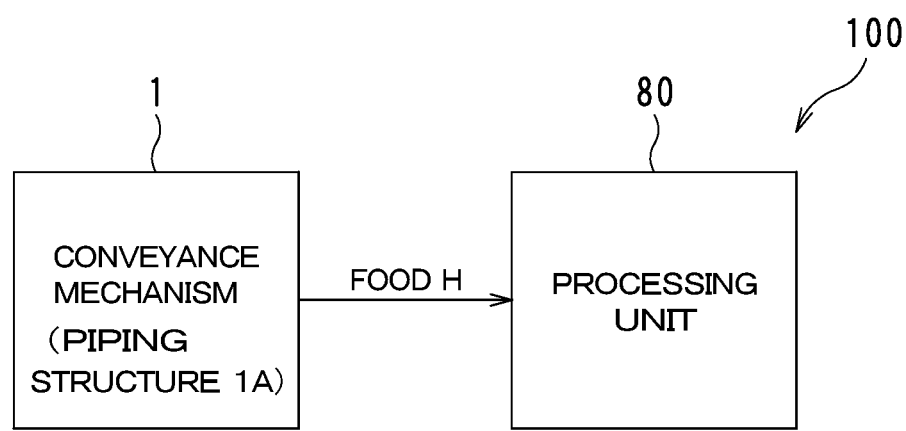
FIG. 1 is a block diagram illustrating a manufacturing system for a processed food according to the present embodiment.

First, an outline of a manufacturing system 100 of a processed food according to the present embodiment will be described with reference to FIG. 1. As illustrated in FIG. 1, the manufacturing system 100 of a processed food includes a conveyance mechanism 1 for conveying a food H, and a processing unit 80 for processing the food H conveyed by the conveyance mechanism 1. In particular, the conveyance mechanism 1 includes a piping structure 1A according to the present embodiment. First, an outline of the conveyance mechanism 1 will be described here.

(Conveyance Mechanism)

Figure 2:
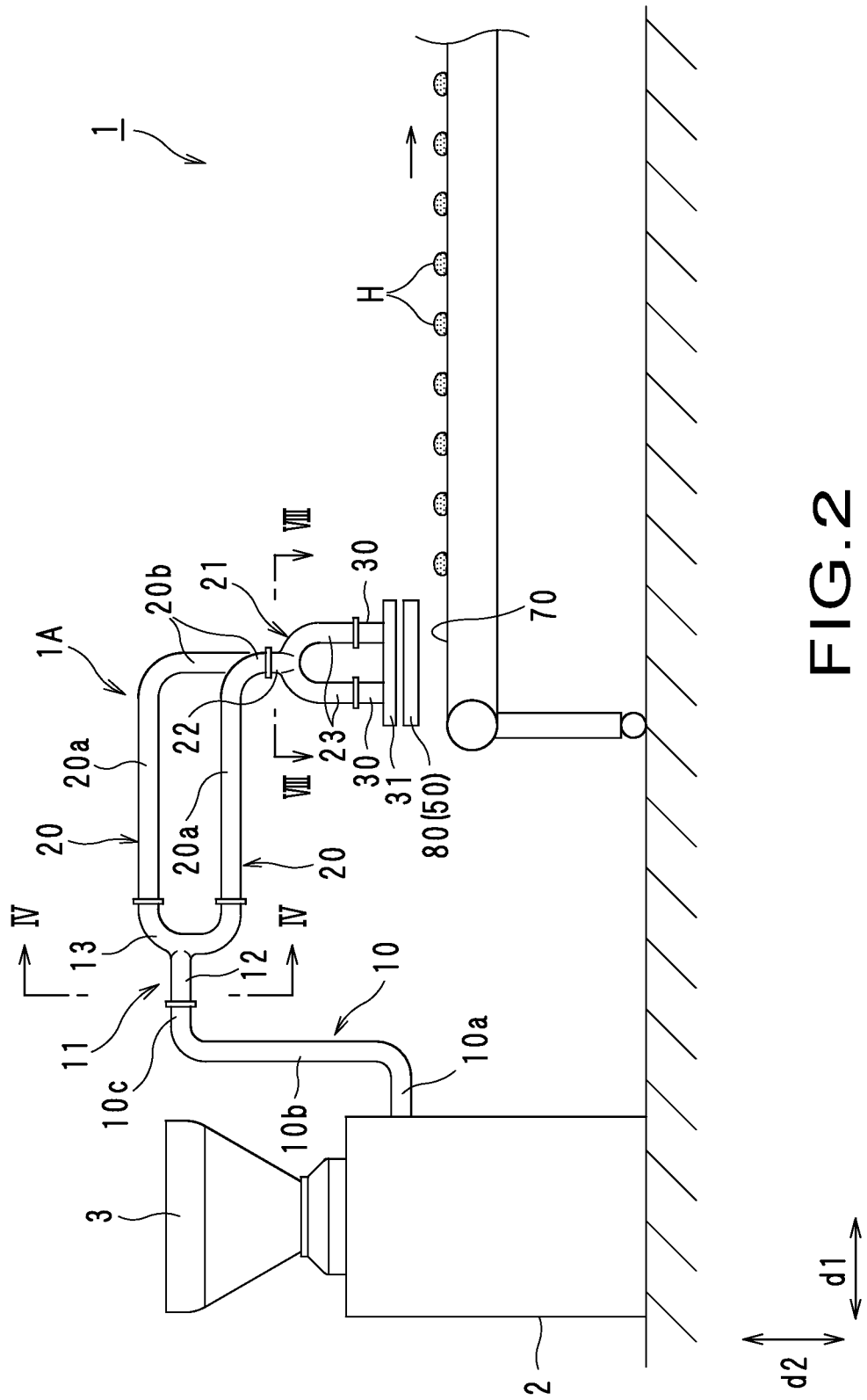
FIG. 2 is a schematic side view illustrating a conveyance mechanism having a piping structure according to the present embodiment and a processing unit.

As illustrated in FIG. 2, the conveyance mechanism 1 includes the piping structure 1A that conveys food. The piping structure 1A includes a first pipe 10 to which the food H is supplied, a plurality of second pipes 20 provided downstream of the first pipe 10 and connected to the first pipe 10, and a plurality of third pipes 30 provided downstream of the second pipes 20, a number of the plurality of third pipes 30 being connected to each of the second pipes 20. In the present embodiment, the second pipes 20 connected to the first pipe 10 are larger in number than the third pipes 30 connected to one of the second pipes 20. As described later, three second pipes 20 are connected to the first pipe 10 (see FIG. 3), and two third pipes 30 are connected to each of the second pipes 20 (see FIG. 10).

As illustrated in FIG. 2, the first pipe 10 includes a first portion 10a connected to a pump 2 to be described later and extending along a first direction d1 (horizontal direction illustrated in FIG. 2), a second portion 10b provided downstream of the first portion 10a and extending along a second direction d2 (vertical direction illustrated in FIG. 2) orthogonal to the first direction d1, and a third portion 10c provided downstream of the second portion 10b and extending along the first direction d1. The first pipe 10 may have an inner diameter of about 30 mm or more and 200 mm or less depending on a size of the food H to be conveyed. Although an example of the piping structure 1A, including one first pipe 10, will be described to clarify the drawings, the piping structure 1A may include a plurality of first pipes 10.

The pump 2 for conveying the food H and a tank (hopper) 3 that accommodates the food H are provided upstream of the first pipe 10, and driving the pump 2 causes the food H to be supplied to the first pipe 10 from the tank 3. In particular, the pump 2 may be, for example, a vacuum pump, a vane pump, or a piston pump. From the viewpoint of reducing damage to the food H, the pump 2 is preferably a vacuum pump.

A first connecting pipe 11 that connects the first pipe 10 and the second pipes 20 is provided downstream of the first pipe 10, and each of the second pipes 20 is connected to the first pipe 10 with the first connecting pipe 11. The first connecting pipe 11 includes a first connecting portion 12 connected to the first pipe 10 and a plurality of first curved portions 13 that are provided downstream of the first connecting portion 12 and that branch off from the first connecting portion 12.

Each of the second pipes 20 includes a first portion 20*a* connected to the first connecting pipe 11 and extending along the first direction d1, and a second portion 20*b* provided downstream of the first portion 20*a* and extending along the second direction d2. In particular, first portions 20*a* are equal in length to each other. The second pipes 20 each may have an inner diameter of about 30 mm or more and 200 mm or less.

A second connecting pipe 21 that connects the second pipe 20 and the third pipes 30 is provided downstream of the second pipe 20, and each of the third pipes 30 is connected to the second pipe 20 with the second connecting pipe 21. The second connecting pipe 21 includes a second connecting portion 22 connected to the second pipe 20 and a plurality of second curved portions 23 that are provided downstream of the second connecting portion 22 and that branch off from the second connecting portion 22.

Each of the third pipes 30 extends along the second direction d2. These third pipes 30 are equal in length to each other. The third pipes 30 each may have an inner diameter of about 30 mm or more and 200 mm or less.

A support member 31 in a plate-like shape for supporting the third pipes 30 is provided downstream of the third pipes 30. Although not illustrated, the support member 31 is fixed to a housing or the like (not illustrated) of the conveyance mechanism 1 with a bolt, for example.

A processing unit 80 that processes the food H conveyed through the third pipes 30 is provided downstream of the support member 31.

(Processing Unit)

The processing unit 80 according to the present embodiment includes a mold plate 50 filled with the food H conveyed through the third pipes 30. The mold plate 50 is provided with an opening (not illustrated) into which the food H conveyed through the third pipe 30 is filled. The opening passes through the mold plate 50 in the second direction d2, and allows the food H filled in the opening to be pushed out onto a conveyor 70 provided downstream (a lower side illustrated in FIG. 1) of the mold plate 50. The food H pushed out from the mold plate 50 is conveyed downstream by the conveyor 70.

Besides the mold plate 50 described above, the processing unit 80 may include, for example, a batter machine that applies batter obtained by dissolving cereal flour in water or beaten egg to the food H, a flouring machine or a breading machine that applies powder such as flour to the food H, a fryer for heating the food H, or the like. The processing unit 80 includes devices that can be appropriately selected according to a processed food to be manufactured. For example, when the food H is processed by firing, the processing unit 80 may include an impingement oven, a conveyor oven, a Schwank burner, or the like. When the food H is processed by steaming, the processing unit 80 may include a steamer, a microwave oven, a continuous boiling tank, or the like. When the food H is meat separated into lumps, the processing unit 80 may have a separation device that separates the food H into pieces each having a desired shape and weight. The processing unit 80 may further include a weighing scale that measures each food H pushed out from the mold plate 50, a casing device that fills the food H in a packaging material, a sausage skin, or the like, a heating device that heats the food H, and/or a freezer that freezes the food H, etc.

Next, the first connecting pipe 11 of the piping structure 1A according to the present embodiment will be described in more detail with reference to FIGS. 3 to 6.

Figure 3:
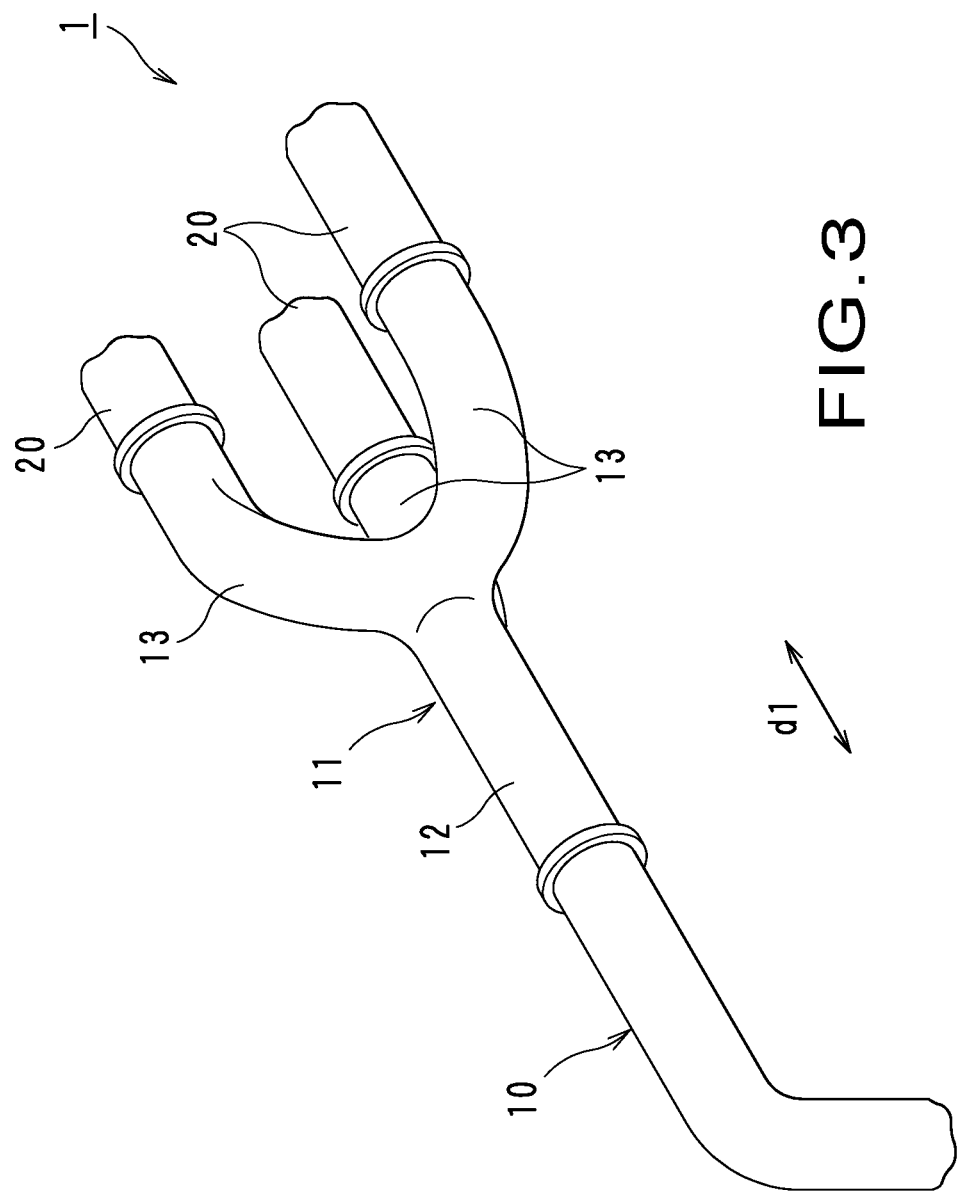
FIG. 3 is a perspective view illustrating a first connecting pipe of the piping structure according to the present embodiment.
Figure 4:
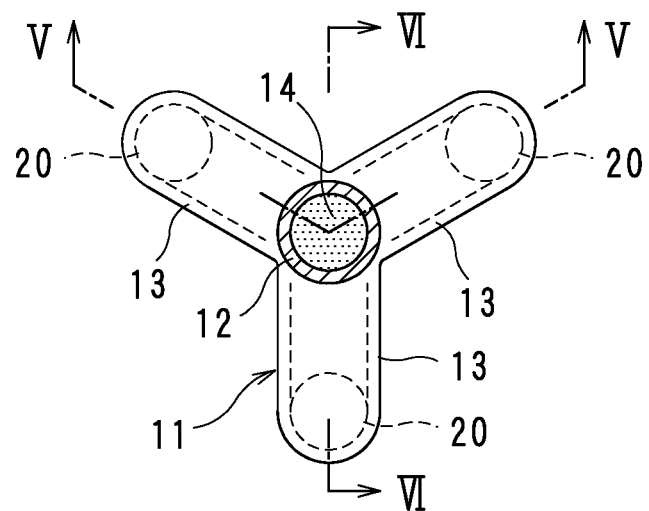
FIG. 4 is a sectional view (a sectional view taken along line IV-IV in FIG. 2) illustrating the first connecting pipe of the piping structure according to the present embodiment.

As illustrated in FIGS. 3 and 4, the first connecting pipe 11 includes three first curved portions 13, and the first curved portions 13 extend in a trifurcated manner from the first connecting portion 12. Each of the first curved portions 13 is connected to one second pipe 20. Thus, three second pipes 20 are connected to the first pipe 10 with the first connecting pipe 11. As described above, the piping structure 1A according to the present embodiment includes one first pipe 10, and thus the piping structure 1A includes the three second pipes 20. As illustrated in FIG. 4, the first curved portions 13 are provided equally distributed by 120° when viewed from upstream.

Figure 5:
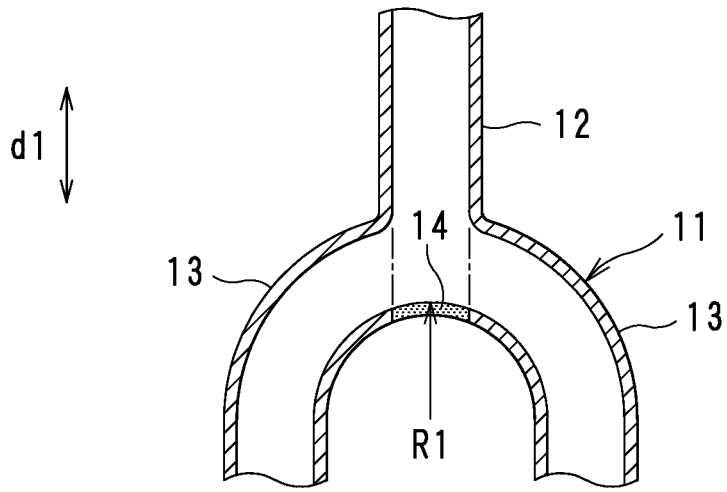
FIG. 5 is a sectional view (a sectional view taken along line V-V in FIG. 4) illustrating the first connecting pipe of the piping structure according to the present embodiment.
Figure 6:
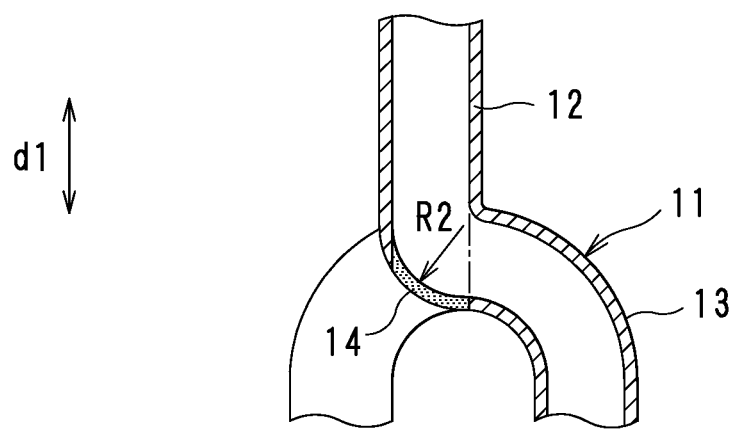
FIG. 6 is a sectional view (a sectional view taken along line VI-VI in FIG. 4) illustrating the first connecting pipe of the piping structure according to the present embodiment.
Figure 7:
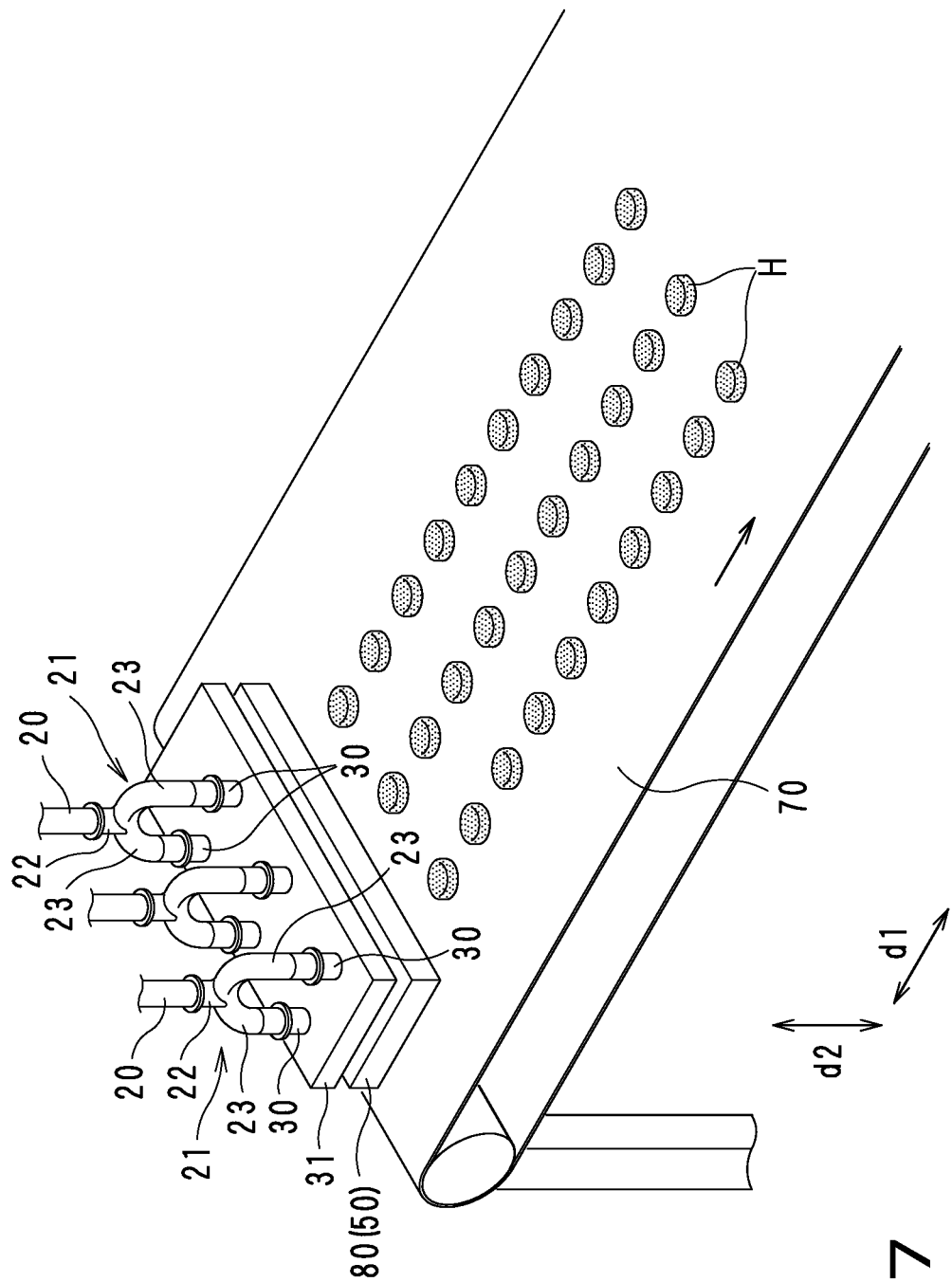
FIG. 7 is a perspective view illustrating a second connecting pipe of the piping structure according to the present embodiment and a processing unit.

As illustrated in FIGS. 5 and 6, a first merging portion 14 where the plurality of first curved portions 13 merges has a curved shape in a section taken along a conveyance direction (in this case, the first direction d1) of the food H. This enables reducing damage to the food H when the food H in the first connecting pipe 11 is distributed to the plurality of first curved portions 13. That is, the food H can be distributed to the plurality of first curved portions 13 without destroying muscle fibers or the like of the food H even when the food H in the first connecting pipe 11 is distributed to the plurality of first curved portions 13 while being pressed against the first merging portion 14, as compared with when the first merging portion 14 has an inverted V shape (i.e., a V-shape such as a tip portion faces upstream) in a section taken along the conveyance direction of the food H or when the first merging portion 14 extends in a direction orthogonal to the conveyance direction of the food H (i.e., the first connecting portion 12 and the first curved portion 13 are formed in a T shape as a whole in the section taken along the conveyance direction of the food H). The first merging portion 14 has a curved shape in the section taken along the conveyance direction of the food H, thereby enabling suppressing a problem in that a part of the food H (e.g., a tendon of beef, a skin of chicken, or the like) is caught on the first merging portion 14. This enables reducing damage to the food H effectively. In the present specification, the "first merging portion" means a portion defined by an inner wall of the first connecting portion 12 (a portion indicated with a dot pattern in FIGS. 4 to 6) in a sectional view of the first connecting portion 12 that is taken along a plane extending in a direction (in this case, the second direction d2) orthogonal to the conveyance direction, and that is a sectional view (FIG. 4) of the first curved portion 13 as viewed from upstream along the first direction d1.

As illustrated in FIG. 5, the first merging portion 14 in this case has an inner surface in a curved shape protruding upstream in the conveyance direction in a section taken along the conveyance direction (in this case, the first direction d1) of the food H, i.e., in the section taken along a direction parallel to a direction in which each of the first curved portions 13 adjacent to each other extends when the first curved portions 13 are viewed from upstream in the conveyance direction (i.e., the section taken along line V-V in FIG. 4). In this case, the inner surface of the first merging portion 14 may have a radius of curvature R1 of about 20 mm or more and 100 mm or less.

As illustrated in FIG. 6, the inner surface of the first merging portion 14 has a curved shape protruding downstream in the conveyance direction in a section taken along the conveyance direction (in this case, the first direction d1) of the food H, i.e., in the section taken along a direction parallel to a direction in which one of the first curved portions 13 extends when the one first curved portion 13 is viewed from upstream in the conveyance direction (i.e., the section taken along line VI-VI in FIG. 4). In this case, the inner surface of the first merging portion 14 may have a radius of curvature R2 of about 30 mm or more and 200 mm or less.

Next, the second connecting pipe 21 of the piping structure 1A according to the present embodiment will be described in more detail with reference to FIGS. 2, and 7 to 10.

Figure 8:
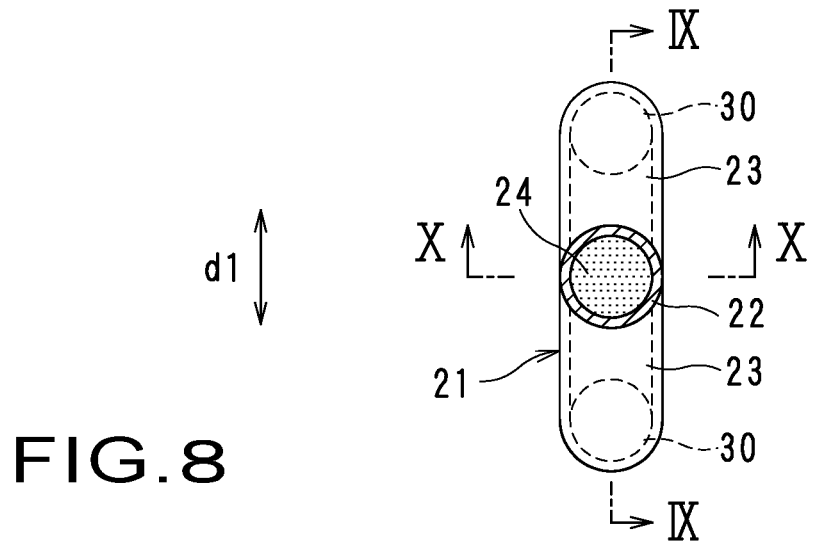
FIG. 8 is a sectional view (a sectional view taken along line VIII-VIII in FIG. 2) illustrating the second connecting pipe of the piping structure according to the present embodiment.

As illustrated in FIG. 2, the second connecting pipe 21 includes two second curved portions 23, and the second curved portions 23 are each formed in a U-shape as a whole. Each of the second curved portions 23 is connected to one third pipe 30. Thus, two third pipes 30 are connected to each of the second pipes 20 with the second connecting pipe 21. As described above, the piping structure 1A according to the present embodiment includes the three second pipes 20, and thus the piping structure 1A includes six third pipes 30 (see FIG. 7). As illustrated in FIG. 8, the second curved portions 23 are provided equally distributed by 180° when viewed from upstream.

Figure 9:
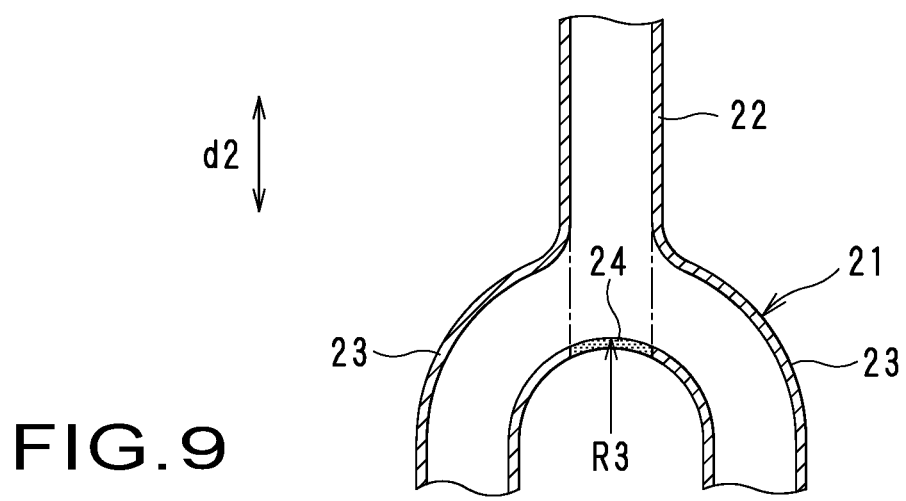
FIG. 9 is a sectional view (a sectional view taken along line IX-IX in FIG. 8) illustrating the second connecting pipe of the piping structure according to the present embodiment.
Figure 10:
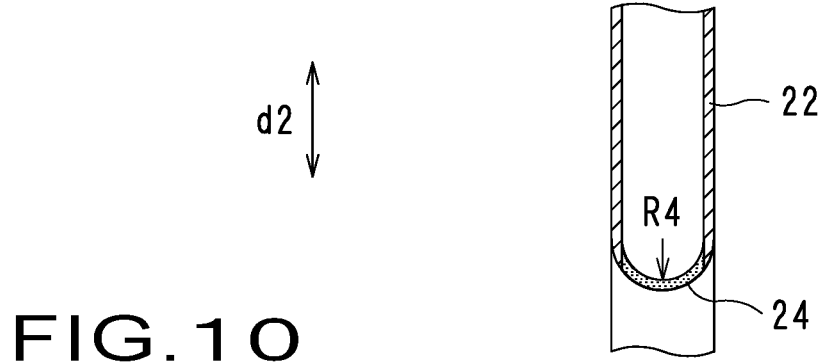
FIG. 10 is a sectional view (a sectional view taken along line X-X in FIG. 8) illustrating the second connecting pipe of the piping structure according to the present embodiment.

As illustrated in FIGS. 9 and 10, a second merging portion 24 where the plurality of second curved portions 23 merges has a curved shape in a section taken along a conveyance direction (in this case, the second direction d2) of the food H. This enables reducing damage to the food H when the food H in the second connecting pipe 21 is distributed to the plurality of second curved portions 23. That is, the food H can be distributed to the plurality of second curved portions 23 without destroying muscle fibers or the like of the food H even when the food H in the second connecting pipe 21 is distributed to the plurality of second curved portions 23 while being pressed against the second merging portion 24, as compared with when the second merging portion 24 has an inverted V shape (i.e., a V-shape such as a tip portion faces upstream) in a section taken along the conveyance direction of the food H or when the second merging portion 24 extends in a direction orthogonal to the conveyance direction of the food H (i.e., the second connecting portion 22 and the second curved portion 23 are formed in a T shape as a whole in the section taken along the conveyance direction of the food H). The second merging portion 24 has a curved shape in the section taken along the conveyance direction of the food H, thereby enabling suppressing a problem in that a part of the food H is caught on the second merging portion 24. This enables reducing damage to the food H effectively. In the present specification, the "second merging portion" means a portion defined by an inner wall of the second connecting portion 22 (a portion indicated with a dot pattern in FIGS. 8 to 10) in a sectional view of the second connecting portion 22 that is taken along a plane extending in a direction (in this case, the first direction d1) orthogonal to the conveyance direction, and that is a sectional view (FIG. 8) of the second curved portion 23 as viewed from upstream along the second direction d2.

As illustrated in FIG. 9, the second merging portion 24 in this case has an inner surface in a curved shape protruding upstream in the conveyance direction in a section taken along the conveyance direction (in this case, the second direction d2) of the food H, i.e., in the section taken along a direction parallel to a direction in which each of the second curved portions 23 extends when each of the second curved portions 23 is viewed from upstream in the conveyance direction (i.e., the section taken along line IX-IX in FIG. 8). In this case, the inner surface of the second merging portion 24 may have a radius of curvature R3 of about 20 mm or more and 100 mm or less.

As illustrated in FIG. 10, the inner surface of the second merging portion 24 has a curved shape protruding downstream in the conveyance direction in a section taken along the conveyance direction (in this case, the second direction d2) of the food H, i.e., in the section taken along a direction orthogonal to a direction in which each of the second curved portions 23 extends when the second merging portion 24 is viewed from upstream in the conveyance direction (i.e., the section taken along line X-X in FIG. 8). In this case, the inner surface of the second merging portion 24 may have a radius of curvature R4 of about 30 mm or more and 200 mm or less.

The piping structure 1A described above may be configured such that the first pipe 10 and the second pipe 20 are each connected to the first connecting pipe 11 with a bolt, or by welding, for example. Similarly, the second pipe 20 and the third pipe 30 may be each connected to the second connecting pipe 21 with a bolt, or by welding, for example. Alternatively, the piping structure 1A described above may be integrally molded by die molding or the like.

Method for Manufacturing Processed Food

Next, a method for manufacturing a processed food of the present invention will be described. The method for manufacturing a processed food according to the present invention includes a step (conveyance step designated by a reference sign S10 in FIG. 11) of conveying the food H by the method for conveying the food H according to the present invention, and a step (processing step designated by a reference sign S20 in FIG. 11) of processing the food H conveyed in the step of conveying the food H. First, a method for conveying the food H of the present invention will be described here.

(Conveyance Method)

The method for conveying the food H of the present invention can be performed using, for example, the above-described conveyance mechanism 1. Hereinafter, an example of the method using the conveyance mechanism 1 will be described.

Figure 11:
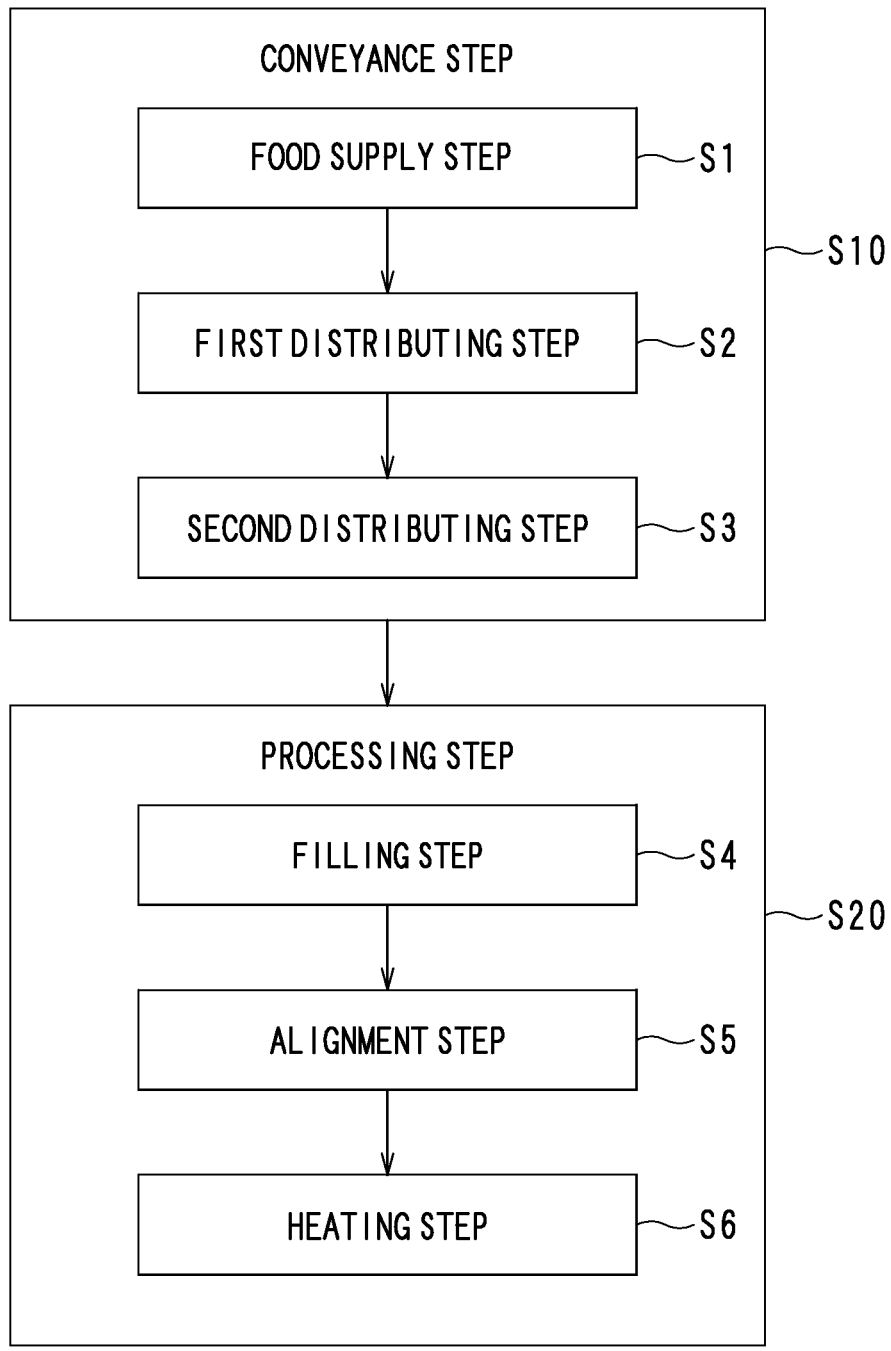
FIG. 11 is a flowchart illustrating a conveyance method according to the present embodiment.

First, the food H is supplied to the first pipe 10 from the tank 3 (food supply step designated by a reference sign S1 in FIG. 11). In this case, the food H is supplied to the first pipe 10 from the tank 3 by driving the pump 2. The food H is coated with seasoning, spices, or the like in a tumbler (not illustrated). Then, the food H supplied to the first pipe 10 is conveyed downstream.

Next, the food H supplied to the first pipe 10 is distributed and conveyed to each of the second pipes 20 connected to the first pipe 10 (first distributing step designated by a reference sign S2 in FIG. 11). At this time, the food H in the first pipe 10 is first conveyed to the first connecting pipe 11 connected to the first pipe 10. Next, the food H passes through the first connecting portion 12 of the first connecting pipe 11 and is distributed to each of the first curved portions 13. In this case, the food H is distributed to the three first curved portions 13.

At this time, the first merging portion 14 where the plurality of first curved portions 13 merges has a curved shape in the section taken along the conveyance direction of the food H (in this case, the first direction d1) (see FIGS. 5 and 6). As a result, even when the food H is pressed against the first merging portion 14 during distribution of the food H in the first connecting pipe 11 to the plurality of first curved portions 13, the food H can be distributed to the plurality of first curved portions 13 without destroying muscle fibers or the like of the food H. The first merging portion 14 has a curved shape in the section taken along the conveyance direction of the food H, thereby enabling suppressing a problem in that a part of the food H (e.g., a skin of chicken) is caught on the first merging portion 14. This enables reducing damage to the food H effectively.

The food H distributed to each of the first curved portions 13 is supplied to the second pipes 20. After that, the food H supplied to the second pipes 20 is conveyed downstream.

Next, the food H supplied to each of the second pipes 20 is distributed and conveyed to a plurality of third pipes 30, a number of the plurality of third pipes 30 being connected to each of the second pipes 20 (second distributing step designated by a reference sign S3 in FIG. 11). At this time, the food H in each of the second pipes 20 is first conveyed to the second connecting pipe 21 connected to the third pipes 30. Subsequently, the food H passes through the second connecting portion 22 of the second connecting pipe 21 and is distributed to each of the second curved portions 23. In this case, the food H is distributed to the two second curved portions 23 in each second connecting pipe 21.

At this time, the second merging portion 24 where the plurality of second curved portions 23 merges has a curved shape in the section taken along the conveyance direction of the food H (in this case, the second direction d2) (see FIGS. 9 and 10). As a result, when the food H in the second connecting pipe 21 is distributed to the plurality of second curved portions 23, the food H can be distributed to the plurality of second curved portions 23 without destroying muscle fibers or the like of the food H. The second merging portion 24 has a curved shape in the section taken along the conveyance direction of the food H, thereby enabling suppressing a problem in that a part of the food H is caught on the second merging portion 24. This enables reducing damage to the food H effectively.

The food H distributed to each of the second curved portions 23 in each second connecting pipes 21 is supplied to the third pipe 30. Then, the food H supplied to the third pipe 30 is conveyed downstream. As described above, the food H is conveyed (conveyance step designated by a reference sign S10 in FIG. 11).

Next, the food H conveyed to the third pipe 30 is processed (processing step designated by a reference sign S20 in FIG. 11). At this time, the food H conveyed to the third pipe 30 is first filled in the mold plate 50 of the processing unit 80 (filling step designated by a reference sign S4 in FIG. 11). The food H is then filled in the opening (not illustrated) of the mold plate 50.

Next, the food H filled in the mold plate 50 is pushed out from the mold plate 50. At this time, the food H is pushed out onto the conveyor 70 through the opening (not illustrated) in the mold plate 50. Then, the food H pushed out is conveyed downstream by the conveyor 70. In this way, the food H is aligned using the mold plate 50 of the processing unit 80 (alignment step designated by a reference sign S5 in FIG. 11).

Next, the food H aligned is further processed as necessary. At this time, the food H is heated (heating step designated by a reference sign S6 in FIG. 11), for example. In this case, the food H is heated by an oven, a fryer, or the like, which is not illustrated, of the processing unit 80. Before the food H is heated, batter may be applied to the food H. In this case, the batter may be applied to the food H by a batter machine (not illustrated) of the processing unit 80, for example. Alternatively, the batter may be applied to the food H before the food H is supplied to the first pipe 10. Before the food H is heated, each food H pushed out from the mold plate 50 may be weighed. When the food H is meat separated into lumps, the food H may be separated into pieces each having a desired shape and weight before the food H is heated.

In this way, a processed food is manufactured.

The processing step may be performed by selecting a step suitable for a target processed food to perform the selected step.

To improve production efficiency, the third pipes 30 for filling the mold plate 50 with the food H need to be increased in number. When the food H is distributed from one pipe (hereinafter, also referred to as an upstream pipe) to many pipes (e.g., six pipes) at a time, pressure in the upstream pipe needs to be increased. When the pressure in the upstream pipe is increased, the food H may be damaged.

In contrast, the piping structure 1A of the conveyance mechanism 1 of the present embodiment includes the first pipe 10, the plurality of second pipes 20 provided downstream of the first pipe 10 and connected to the first pipe 10, and the plurality of third pipes 30 provided downstream of the second pipes 20, a number of the plurality of third pipes 30 being connected to each of the second pipes 20. This enables not only an increase in number of third pipes 30, but also a reduction in number of pipes connected to one pipe. For example, in the present embodiment, three second pipes 20 are connected to one first pipe 10, and two third pipes 30 are connected to one of the second pipes 20. The reduction in number of pipes connected to one pipe as described above enables the food H to be smoothly conveyed even when pressure in the pipe is reduced. This enables reducing pressure in piping when the food H is conveyed as compared with when the food H is distributed from one pipe to many pipes (e.g., six pipes) at a time. As a result, damage to the food H during conveyance can be reduced. The third pipes 30 can be increased in number, so that production efficiency can be improved.

As described above, the second pipes 20 connected to the first pipe 10 are larger in number than the third pipes 30 connected to one of the second pipes 20. When the food H is conveyed through from the first pipe 10 to the third pipe 30, a pressure loss is expected to occur in each pipe. Thus, pressing force acting on the food H when the food H is pressed against the first merging portion 14 of the first connecting pipe 11 that connects the first pipe 10 and the second pipes 20 is expected to be larger than pressing force acting on the food H when the food H is pressed against the second merging portion 24 of the second connecting pipe 21 that connects the second pipe 20 and the third pipes 30. As a result, when the food H is pressed against the first merging portion 14 of the first connecting pipe 11, a large pressing force may act on the food H. When the large pressing force acts on the food H, the food H may be damaged.

In contrast, according to the present embodiment, the second pipes 20 connected to the first pipe 10 are larger in number than the third pipes 30 connected to one of the second pipes 20. This enables the food H conveyed in the first pipe 10 to be relatively smoothly guided to the second pipe 20 as compared with when the second pipes 20 connected to the first pipe 10 are smaller in number than the third pipes 30 connected to one of the second pipes 20. That is, the food H can be relatively smoothly guided to the second pipe 20 while a large pressing force is prevented from acting on the food H in the first merging portion 14 under a large pressure. This enables damage to the food H during conveyance to be further reduced. Additionally, an increase in number of pipes connected to one pipe downstream in the conveyance direction can be suppressed due to the second pipes 20 connected to the first pipe 10 that are larger in number than the third pipes 30 connected to one of the second pipes 20 as compared with when the second pipes 20 connected to the first pipe 10 are smaller in number than the third pipes 30 connected to one of the second pipes 20.

This enables not only pressure in piping when the food H is conveyed to be reduced, but also damage to the food H during conveyance to be further reduced.

As described above, according to the present embodiment, the piping structure 1A includes the first pipe 10, the plurality of second pipes 20 provided downstream of the first pipe 10 and connected to the first pipe 10, and the plurality of third pipes 30 provided downstream of the second pipes 20, a number of the plurality of third pipes 30 being connected to each of the second pipes 20. This enables not only an increase in number of third pipes 30, but also a reduction in number of pipes connected to one pipe. Thus, even when pressure in piping is reduced, the food H can be smoothly conveyed. This enables reducing not only pressure in piping when the food H is conveyed but also damage to the food H during conveyance as compared with when the food H is distributed from one pipe to many pipes (e.g., six pipes) at a time. The third pipes 30 can be increased in number, so that production efficiency can be improved.

Using the piping structure 1A according to the present embodiment enables reducing variations in weight of the food H as compared with when an operator manually aligns the food H and then conveys the aligned food H with a conveyor.

According to the present embodiment, the second pipes 20 connected to the first pipe 10 are larger in number than the third pipes 30 connected to one of the second pipes 20. This enables the food H conveyed in the first pipe 10 to be relatively smoothly guided to the second pipe 20. That is, the food H can be relatively smoothly guided to the second pipe 20 while a large pressing force is prevented from acting on the food H in the first merging portion 14 under a large pressure. This enables damage to the food H during conveyance to be further reduced. Additionally, an increase in number of pipes connected to one pipe downstream in the conveyance direction can be suppressed due to the second pipes 20 connected to the first pipe 10 that are larger in number than the third pipes 30 connected to one of the second pipes 20 as compared with when the second pipes 20 connected to the first pipe 10 are smaller in number than the third pipes 30 connected to one of the second pipes 20. This enables not only pressure in piping when the food H is conveyed to be reduced, but also damage to the food H during conveyance to be further reduced.

According to the present embodiment, each of the second pipes 20 is connected to the first pipe 10 with the first connecting pipe 11, the first connecting pipe 11 including the first connecting portion 12 connected to the first pipe 10 and the plurality of first curved portions 13 that are provided downstream of the first connecting portion 12 and that branch off from the first connecting portion 12, and the plurality of first curved portions 13 merging in the first merging portion 14 that has a curved shape in a section taken along the conveyance direction of the food H. This enables reducing damage to the food H when the food H in the first connecting pipe 11 is distributed to the plurality of first curved portions 13. That is, even when the food H is pressed against the first merging portion 14 during distribution of the food H in the first connecting pipe 11 to the plurality of first curved portions 13, the food H can be distributed to the plurality of first curved portions 13 without destroying muscle fibers or the like of the food H. The first merging portion 14 has a curved shape in the section taken along the conveyance direction of the food H, thereby enabling suppressing a problem in that a part of the food H (e.g., a skin of chicken) is caught on the first merging portion 14. This enables reducing damage to the food H effectively.

According to the present embodiment, each of the third pipes 30 is connected to the second pipe 20 with the second connecting pipe 21, the second connecting pipe 21 including the second connecting portion 22 connected to the second pipe 20 and the plurality of second curved portions 23 that are provided downstream of the second connecting portion 22 and that branch off from the second connecting portion 22, and the plurality of second curved portions 23 merging in the second merging portion 24 that has a curved shape in a section taken along the conveyance direction of the food H. This enables reducing damage to the food H when the food H in the second connecting pipe 21 is distributed to the plurality of second curved portions 23. The second merging portion 24 has a curved shape in the section taken along the conveyance direction of the food H, thereby enabling suppressing a problem in that a part of the food H is caught on the second merging portion 24. This enables reducing damage to the food H effectively.

According to the present embodiment, the manufacturing system 100 of a processed food includes the conveyance mechanism 1 having the piping structure 1A according to the present embodiment, and the processing unit 80 that processes the food H conveyed by the conveyance mechanism 1. This enables reducing damage to the food H used for the processed food, and thus enabling not only preventing an aesthetic appearance of the processed food from being impaired, but also preventing an adverse effect from occurring on taste such as texture. Thus, the processed food manufactured can be improved in quality.

In the above-described embodiment, an example has been described in which the second pipes 20 connected to the first pipe 10 are larger in number than the third pipes 30 connected to one of the second pipes 20. Besides this, the second pipes 20 connected to the first pipe 10 may be smaller in number than the third pipes 30 connected to one of the second pipes 20. Even in this case, the piping structure 1A includes the first pipe 10, the plurality of second pipes 20 connected to the first pipe 10, and the plurality of third pipes 30, a number of the plurality of third pipes 30 being connected to each of the second pipes 20, and thus enabling not only an increase in number of third pipes 30, but also a reduction in number of pipes connected to one pipe. Thus, even when pressure in piping is reduced, the food H can be smoothly conveyed. This enables reducing not only pressure in piping when the food H is conveyed but also damage to the food H during conveyance as compared with when the food H is distributed from one pipe to many pipes at a time. The third pipes 30 can be increased in number, so that production efficiency can be improved.

Although the piping structure 1A of the above-described embodiment has placement of the first pipe 10, the second pipes 20, and the third pipes 30, the placement is merely an example and thus can be appropriately changed according to an installation space for installing the conveyance mechanism 1, or the like. For example, an example has been described in the above-described embodiment, in which the first pipe 10 includes the first portion 10a extending along the first direction d1, the second portion 10b extending along the second direction d2, and the third portion 10c extending along the first direction d1. Besides this, the first pipe 10 may extend in a straight line along the first direction d1 or the second direction d2.

Additionally, an example has been described in the above-described embodiment, in which each of the second pipes 20 include the first portion 20a extending along the first direction d1 and the second portion 20b extending along the second direction d2. Besides this, the first pipe 10 may extend in a straight line along the first direction d1 or the second direction d2.

An example has been described in the above-described embodiment, the example including the support member 31 provided downstream of the third pipes 30, the mold plate 50 provided downstream of the support member 31, and the conveyor 70 provided downstream of the mold plate 50. Besides this, the food H conveyed through the third pipe 30 may be directly put into a flyer or the like (not illustrated) of the processing unit 80 without being aligned, for example.

Additionally, an example has been described in the above-described embodiment, in which the processed food is a meat product manufactured from meat cut into a lump. Besides this, the processed food may be a hamburger steak, a meat ball, or the like manufactured from meat molded into a lump. In this case, the food conveyed by the piping structure 1A may be minced meat or chopped meat. Even in this case, damage to food can be reduced, so that an adverse effect on taste such as texture can be suppressed.

The present invention is not limited to the embodiment and modification described above. For example, various modifications may be added to each element of the embodiment and modification described above. The embodiment of the present invention includes an aspect including components and/or methods other than the components and/or methods described above. The embodiment of the present invention also includes an aspect in which some of the components and/or methods described above are not included. The effects exhibited by the present invention are not limited to the above-described effects, and a specific effect according to a specific configuration of the embodiment can also be exhibited. Thus, various additions, modifications, and partial deletions can be made to each element described in the scope of claims, the specification, the abstract, and the drawings without departing from the technical idea and spirit of the present invention.

The invention claimed is:

1. A piping structure for conveying food, the piping structure comprising:
   a first pipe to which the food is supplied;
   a plurality of second pipes provided downstream of the first pipe and connected to the first pipe in a conveyance direction of the food; and
   a plurality of third pipes provided downstream of the plurality of second pipes, at least two of the plurality of third pipes being connected to each of the plurality of second pipes,
   wherein each of the plurality of second pipes is connected to the first pipe via a first connecting pipe,
   the first connecting pipe includes a first connecting portion connected to the first pipe and a plurality of first curved portions that are provided downstream of the first connecting portion and that branch off from the first connecting portion,
   each of the plurality of third pipes is connected to the plurality of second pipes via a second connecting pipe,
   the second connecting pipe includes a second connecting portion connected to each of the plurality of second pipes and a plurality of second curved portions that are provided downstream of the second connecting portion and that branch off from the second connecting portion,
   in a section taken along the conveyance direction of the food and taken along a direction parallel to a direction in which each of the plurality of first curved portions adjacent to each other extends when the plurality of first curved portions are viewed from upstream in the conveyance direction, a first merging portion where the plurality of first curved portions merges has an inner surface in a curved shape protruding upstream in the conveyance direction,
   in a section taken along the conveyance direction of the food and taken along a direction parallel to a direction in which one of the plurality of first curved portions extends when one first curved portion is viewed from upstream in the conveyance direction, the inner surface of the first merging portion has a curved shape protruding downstream in the conveyance direction,
   in a section taken along the conveyance direction of the food and taken along a direction parallel to a direction in which each of the plurality of second curved portions extends when each of the plurality of second curved portions is viewed from upstream in the conveyance direction, a second merging portion where the plurality of second curved portions merges has an inner surface in a curved shape protruding upstream in the conveyance direction, and
   in a section taken along the conveyance direction of the food and taken along a direction orthogonal to a direction in which each of the plurality of second curved portions extends when the second merging portion is viewed from upstream in the conveyance direction, the inner surface of the second merging portion has a curved shape protruding downstream in the conveyance direction.

2. The piping structure according to claim 1, wherein a number of the plurality of second pipes connected to the first pipe are larger than a number of the plurality of third pipes connected to each of the plurality of second pipes.

3. The piping structure according to claim 1, wherein the plurality of second pipes comprises three second pipes, and the three second pipes are connected to the first pipe, and
   the plurality of third pipes comprises two third pipes, and the two third pipes are connected to each of the plurality of second pipes.

4. A manufacturing system for a processed food, comprising:
   a conveyance mechanism including the piping structure according to claim 1; and
   a processing unit that processes the food conveyed by the conveyance mechanism.

* * * * *